US012488456B2

(12) United States Patent
Koelling et al.

(10) Patent No.: US 12,488,456 B2
(45) Date of Patent: Dec. 2, 2025

(54) THREE-DIMENSIONAL TRACKING AND MAPPING OF ATOMIC PLANES IN ATOM PROBE TOMOGRAPHY IMAGING

(71) Applicants: Sebastian Koelling, Montreal (CA); Oussama Moutanabbir, Montreal (CA)

(72) Inventors: Sebastian Koelling, Montreal (CA); Oussama Moutanabbir, Montreal (CA)

(73) Assignee: ÉCOLE POLYTECHNIQUE DE MONTRÉAL, Montreal (CA)

( * ) Notice: Subject to any disclaimer, the term of this patent is extended or adjusted under 35 U.S.C. 154(b) by 0 days.

(21) Appl. No.: 17/844,996

(22) Filed: Aug. 30, 2022

(65) Prior Publication Data

US 2023/0038727 A1 Feb. 9, 2023

(51) Int. Cl.
*G06T 7/00* (2017.01)
*G06T 5/10* (2006.01)
*G06T 7/60* (2017.01)
*G06T 17/00* (2006.01)
*G06V 10/74* (2022.01)

(52) U.S. Cl.
CPC ............ *G06T 7/0012* (2013.01); *G06T 5/10* (2013.01); *G06T 7/60* (2013.01); *G06T 17/00* (2013.01); *G06V 10/761* (2022.01); *G06T 2200/24* (2013.01); *G06T 2207/10072* (2013.01); *G06T 2207/20056* (2013.01)

(58) Field of Classification Search
CPC .......... G06T 7/0012; G06T 5/10; G06T 7/60; G06T 17/00; G06T 2200/24; G06T 2207/10072; G06T 2207/20056; G06T 11/008; G06V 10/761; H01J 37/285

See application file for complete search history.

(56) References Cited

PUBLICATIONS

APT spatial reconstruction, Larson et al 2013 (Year: 2013).*
Pages from Book-Atom Probe Tomography, Miller 2000 (Year: 2000).*
Atom probe tomography, Kelly et al 2007 (Year: 2007).*
Blavette et al.: An atom probe for three-dimensional tomography, Nature 363, 432 (1993).
Cerezo at al.: New dimensions in atom-probe analysis, Surface Science 266, 481 (1992).

(Continued)

*Primary Examiner* — Jianxun Yang
(74) *Attorney, Agent, or Firm* — KDW FIRM PLLC

(57) ABSTRACT

There are provided techniques for analyzing an atom probe tomography data set obtained from a tip-shaped sample. The techniques include defining analysis sub-volumes in the atom probe tomography data set; performing a fast Fourier transform (FFT) on each of the analysis sub-volumes to obtain a signal in a Fourier domain; identifying at least one FFT peak in the signal in the Fourier domain, each FFT peak being indicative of an expected crystal feature in the corresponding analysis sub-volume; continuously and automatically calculating an image compression factor and a radius of the tip-shaped sample, based on identified crystal features, the identified crystal features being obtained from a collection of expected crystal features; and reconstructing a three-dimensional model of the tip-shaped sample. Said reconstructing includes comparing the identified crystal features with calibration data; and dynamically adjusting the image compression factor and the radius of the tip-shaped sample.

31 Claims, 9 Drawing Sheets

(56) References Cited

PUBLICATIONS

Bas et al.: A general protocol for the reconstruction of 3D atom probe data, Applied Surface Science 87-88, 298 (1995).
Geiser et al.: Wide-Field-of-View Atom Probe Reconstruction, Microscopy and Microanalysis 15(2), 292 (2009).
Kelly: Atom probe tomography, Review of Scientific Instruments 78, 031101 (2007).
Geiser et al., Spatial Distribution Maps for Atom Probe Tomography, Microsc. Microanal. 13, 437 (2007).
Gault et al.: Advances in the calibration of atom probe tomographic reconstruction, Journal of Applied Physics 105, 034913 (2009).
Gault et al.: Advances in the reconstruction of atom probe tomography data, Ultramicroscopy 111, 448 (2011).
Gault et al.: Estimation of the Reconstruction Parameters for Atom Probe Tomography, Microscopy and Microanalysis 14, 296 (2008).
Herbig, Choi & Raabe: Combining structural and chemical information at the nanometer scale by correlative transmission electron microscopy and atom probe tomography, Ultramicroscopy 153, 32 (2015).
Herbig et al.: Atomic-Scale Quantification of Grain Boundary Segregation in Nanocrystalline Material, Physical Review Letters 112, 126103 (2014).
Edelsbrunner, Letscher & Zomorodian: Topological Persistence and Simplification, Discrete & Computational Geometry 28, 511 (2002).
Zomorodian & Carlsson: Computing Persistent Homology, Discrete & Computational Geometry 33, 249 (2005).
Vurpillot et al.: Pragmatic reconstruction methods in atom probe tomography, Ultramicrscopy 111, 1286 (2011).
Ceguerra et al.: The rise of computational techniques in atom probe microscopy, Current Opinion in Solid State and Materials Science 17, 224 (2013).
Beinke, Oberdorfer & Schmitz: Towards an accurate vol. reconstruction in atom probe tomography, Ultramicroscopy 165, 34 (2016).
Rolland et al.: New Atom Probe Tomography Reconstruction Algorithm for Multilayered Samples: Beyond the Hemispherical Constraint, Microscopy and Microanalysis 23, 247 (2017).
Vurpillot & Oberdorfer: Modeling Atom Probe Tomography: A review, Ultramicroscopy 159, 202 (2015).
Silaeva, Karahka & Kreuzer: Atom Probe Tomography and field evaporation of insulators and semiconductors: Theoretical issues, Current Opinion in Solid State and Materials Science 17, 211 (2013).
Wallace et al.: On the retrieval of crystallographic information from atom probe microscopy data via signal mapping from the detector coordinate space, Ultramicroscopy 189, 65 (2018).
Vurpillot et al.: Structural analyses in three-dimensional atom probe: a Fourier transform approach, Journal of Microscopy 203, 295 (2001).
Vurpillot, Bostel & Blavette: The shape of field emitters and the ion trajectories in three-dimensional atom probes, Journal of Microscopy 196(3), 332 (1999).
Liddicoat et al.: Nanostructural hierarchy increases the strength of aluminium alloys, Nat. Commun. 1, 63 (2010).
Cameca—IVAS—URL: https://www.cameca.com/service/software/ivas.
Cameca—AP Suite 6—URL: https://www.cameca.com/service/software/apsuite.
Scipy—Hierarchical clustering—URL: https://docs.scipy.org/doc/scipy/reference/cluster.hierarchy.html.
Wikipedia—X-Ray crystallography—URL: https://en.wikipedia.org/wiki/X-ray_crystallography.

\* cited by examiner

THREE-DIMENSIONAL TRACKING AND MAPPING OF ATOMIC PLANES IN ATOM PROBE TOMOGRAPHY IMAGING

TECHNICAL FIELD

The technical field generally relates to atomic-level imaging, and more particularly to techniques for analyzing atom probe tomography data.

BACKGROUND

Wide-angle three-dimensional atom probe tools configured to perform three-dimensional atomic scale tomography were introduced during the 1990s, see for example references 1 and 2. During the same period, algorithms were developed to calculate approximate positions of the analyzed ions or atoms from the measured data (see for example references 3 and 4). The method presented in reference 4 has become an industry standard. Indeed, a very similar algorithm is implemented in the software IVAS (see for example reference 5) and the AP Suite (see for example reference 6). These software packages are commonly used in the industry for atom probe tomography (APT) data analysis. An example of a commercially available tool is provided by the company Cameca.

Challenges still exist in the field of APT data analysis, notably in terms of precision, adaptability and speed.

SUMMARY

In accordance with one aspect, there is provided a method for analyzing an atom probe tomography data set obtained from a tip-shaped sample, the method including:
  defining analysis sub-volumes in the atom probe tomography data set;
  performing a fast Fourier transform (FFT) on each of the analysis sub-volumes to obtain a signal in a Fourier domain;
  identifying at least one FFT peak in the signal in the Fourier domain, each FFT peak being indicative of an expected crystal feature in the corresponding analysis sub-volume;
  continuously and automatically calculating an image compression factor and a radius of the tip-shaped sample, based on identified crystal features, the identified crystal features being obtained from a collection of expected crystal features; and
  reconstructing a three-dimensional model of the tip-shaped sample, including:
    comparing the identified crystal features with calibration data; and
    dynamically adjusting the image compression factor and the radius of the tip-shaped sample.

In some embodiments, the calibration data includes at least one set of known crystal properties, said at least one set of known crystal properties including at least one of theoretical properties and empirical properties.

In some embodiments, each analysis sub-volume has a thickness corresponding to about 10 nm of a material forming the tip-shaped sample.

In some embodiments, the method further includes collecting two-dimensional data with a detector.

In some embodiments, the method further includes constructing the atom probe tomography data set by virtually stacking the two-dimensional data.

In some embodiments, said continuously and automatically calculating the image compression factor and the radius of the tip-shaped sample is performed in real time or near real time.

In some embodiments, said comparing the identified crystal features with the calibration data includes determining whether the identified crystal features match the calibration data.

In accordance with another aspect, there is provided a computer-implemented method executable by a processor for analyzing an atom probe tomography data set obtained from a tip-shaped sample, said method including:
  defining analysis sub-volumes in the atom probe tomography data set;
  performing a fast Fourier transform (FFT) on each of the analysis sub-volumes to obtain a signal in a Fourier domain;
  identifying at least one FFT peak in the signal in the Fourier domain, each FFT peak being indicative of an expected crystal feature in the corresponding analysis sub-volume;
  continuously and automatically calculating an image compression factor and a radius of the tip-shaped sample, based on identified crystal features, the identified crystal features being obtained from a collection of expected crystal features; and
  reconstructing a three-dimensional model of the tip-shaped sample, including:
    comparing the identified crystal features with calibration data; and
    dynamically adjusting the image compression factor and the radius of the tip-shaped sample.

In some embodiments, the calibration data includes at least one set of known crystal properties, said at least one set of known crystal properties including at least one of theoretical properties and empirical properties.

In some embodiments, each analysis sub-volume has a thickness corresponding to about 10 nm of a material forming the tip-shaped sample.

In some embodiments, the computer-implemented method further includes collecting two-dimensional data with a detector.

In some embodiments, the computer-implemented method further includes constructing the atom probe tomography data set by virtually stacking the two-dimensional data.

In some embodiments, said continuously and automatically calculating the image compression factor and the radius of the tip-shaped sample is performed in real time or near real time.

In some embodiments, said comparing the identified crystal features with the calibration data includes determining whether the identified crystal features match the calibration data.

In accordance with another aspect, there is provided a non-transitory computer readable storage medium having stored thereon computer executable instructions for analyzing an atom probe tomography data set obtained from a tip-shaped sample, the computer executable instructions, when executed by a processor, cause the processor to perform the following steps:
  defining analysis sub-volumes in the atom probe tomography data set;
  performing a fast Fourier transform (FFT) on each of the analysis sub-volumes to obtain a signal in a Fourier domain;

identifying at least one FFT peak in the signal in the Fourier domain, each FFT peak being indicative of an expected crystal feature in the corresponding analysis sub-volume;

continuously and automatically calculating an image compression factor and a radius of the tip-shaped sample, based on identified crystal features, the identified crystal features being obtained from a collection of expected crystal features; and reconstructing a three-dimensional model of the tip-shaped sample, including:

comparing the identified crystal features with calibration data; and dynamically adjusting the image compression factor and the radius of the tip-shaped sample.

In some embodiments, the calibration data includes at least one set of known crystal properties, said at least one set of known crystal properties including at least one of theoretical properties and empirical properties.

In some embodiments, each analysis sub-volume has a thickness corresponding to about 10 nm of a material forming the tip-shaped sample.

In some embodiments, the non-transitory computer readable storage medium further includes collecting two-dimensional data with a detector.

In some embodiments, the non-transitory computer readable storage medium further includes constructing the atom probe tomography data set by virtually stacking the two-dimensional data.

In some embodiments, said continuously and automatically calculating the image compression factor and the radius of the tip-shaped sample is performed in real time or near real time.

In some embodiments, said comparing the identified crystal features with the calibration data includes determining whether the identified crystal features match the calibration data.

In accordance with another aspect, there is provided a system for analyzing an atom probe tomography data set obtained from a tip-shaped sample, the system including:

a detector operable for generating the atom probe tomography data set; and at least one processor configured for:

defining analysis sub-volumes in the atom probe tomography data set;

performing a fast Fourier transform (FFT) on each of the analysis sub-volumes to obtain a signal in a Fourier domain;

identifying at least one FFT peak in the signal in the Fourier domain, each FFT peak being indicative of an expected crystal feature in the corresponding analysis sub-volume;

continuously and automatically calculating an image compression factor and a radius of the tip-shaped sample, based on identified crystal features, the identified crystal features being obtained from a collection of expected crystal features; and reconstructing a three-dimensional model of the tip-shaped sample, including:

comparing the identified crystal features with calibration data; and dynamically adjusting the image compression factor and the radius of the tip-shaped sample.

In some embodiments, the system further includes a user interface in data communication with said at least one processor, the user interface being configured to provide inputs to the system.

In some embodiments, the user interface is a graphical user interface configured to provide a visual representation of the three-dimensional model of the tip-shaped sample.

In some embodiments, the detector is configured to collect two-dimensional data.

In some embodiments, said at least one processor is further configured for constructing the atom probe tomography data set by virtually stacking the two-dimensional data.

In some embodiments, the detector is a position-sensitive single ion detector.

In some embodiments, the calibration data includes at least one set of known crystal properties, said at least one set of known crystal properties including at least one of theoretical properties and empirical properties.

In some embodiments, each analysis sub-volume has a thickness corresponding to about 10 nm of a material forming the tip-shaped sample.

In some embodiments, said continuously and automatically calculating the image compression factor and the radius of the tip-shaped sample is performed in real time or near real time.

In some embodiments, said at least one processor is further configured for determining whether the identified crystal features match the calibration data.

In one implementation, there is provided a method for analyzing atom probe tomography data. The method includes a step of performing a fast Fourier transform on z-coordinates of a dummy reconstruction to signal or determine the presence of crystal structures in sub-volumes of the measurement. The method also includes filtering the sub-volumes that are likely to contain crystal features. In some embodiments, the filtering step may include using a peak-filtering algorithm such as persistent homology. The method also includes tracking the crystal features throughout the volume. In some embodiments, the tracking step may include using an unsupervised machine learning algorithm such as a hierarchical clustering. The method also includes calculating an image compression factor (ICF) of the projection for each z-slice of sub-volumes, based on the identified crystal features and the known angles between them. The method also includes calculating the effective radius of the imaged part of the tip based on the volume the ions or atoms in the z-slice are known to occupy and the ICF. The method allows tracking the ICF and the radius of the tip throughout the measurement. The z-slices may be reduced to volumes corresponding to approximately 5 to 10 nm of actual material removal. The method may then be compatible with techniques for tracking these parameters on approximately 5 to 10 nm steps.

Other features will be better understood upon reading of embodiments thereof with reference to the appended drawings.

BRIEF DESCRIPTION OF THE DRAWINGS

FIG. 9 shows that atomic plane with a spacing down to at least 35 picometers are found by the present techniques. For each plane set a spatial distribution map is shown (see reference 28), supporting that the atomic planes are indeed imaged in the data set at the position predicted by the present techniques. For each plane set the expected distance between planes and the expected angle to the (002) plane is compared to the measured spacing and angle in the reconstructed 3D image. FIG. 9 illustrates the usefulness of the present techniques in verifying and calibrating different reconstruction techniques for the generation of 3D atomic resolution images from atom probe data sets.

DETAILED DESCRIPTION

Figure 1:
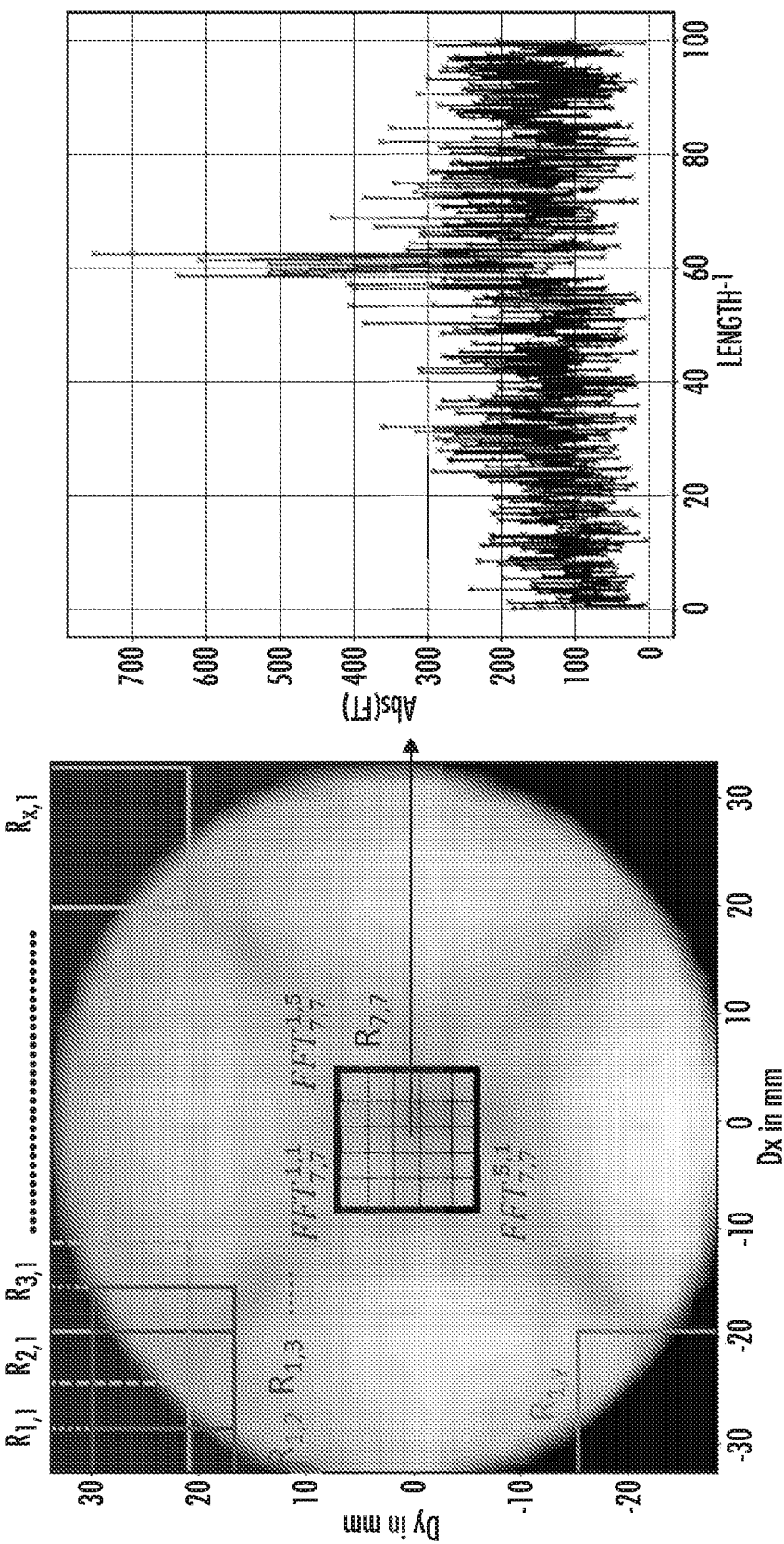
FIGS. 1A AND 1B present a detector map of an APT data set (left). The $R_{x,x}$ windows show an exemplary progression of windows used to reconstruct and search through parts of the data bit by bit in order to find signals related to crystalline features of the analyzed material. For $R_{7,7}$ an exemplary grid used for Fast Fourier Transforms (FFT) of the z-coordinate of the ions in this region is shown. An example of the result of an FFT is shown on the right.

In the following description, similar features in the drawings have been given similar reference numerals. In order to not unduly encumber the figures, some elements may not be indicated on some figures if they were already mentioned in preceding figures. It should also be understood herein that the elements of the drawings are not necessarily drawn to scale and that the emphasis is instead being placed upon clearly illustrating the elements and structures of the present embodiments.

The terms "a", "an" and "one" are defined herein to mean "at least one", that is, these terms do not exclude a plural number of items, unless stated otherwise.

Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application.

Unless stated otherwise, the terms "connected" and "coupled", and derivatives and variants thereof, refer herein to any structural or functional connection or coupling, either direct or indirect, between two or more elements. For example, the connection or coupling between the elements may be acoustical, mechanical, optical, electrical, logical, or any combination thereof.

The expression "heterostructure" will be used in the description and refers to a structure including at layers with different composition, lattice strain and/or electronic properties.

The term "alloy" refers to a material or a composition including at least two different elements. For example, and without being limitative, an alloy could include two, three or more elements.

The term "p-type doping" refers to the incorporation of an impurity in the growing layer to create an excess of positive charges known as holes. The term "n-type doping" refers to the incorporation of an impurity in the growing layer to create an excess of negative charges known as electrons. The term "intrinsic doping (i)" refers to the case where a semiconductor layer has no excess negative or positive charges.

The terms "p-n junction" or "n-p junction" refer to two successive layers, wherein one layer is p-type doped and the other one is n-type doped. The terms "p-i-n junction" or "n-i-p junction" refer to three successive layers, wherein one layer is p-type doped, one is intrinsic, and one is n-type doped.

General Theoretical Context

Atom probe tomography (APT) is a technique that allows imaging and determining a chemical composition of a sample. The sample is provided as a tip having at least one relatively curved surface. During measurements, ions are removed from the relatively curved surface and projected towards a detector, the detector having a relatively flat surface (see for example references 1 to 3). The detector may be, for example, a single ion detector.

The measurements may provide a broad variety of information, such as, for example, the two-dimensional impact position of the ions on the detector and the time-of-flight (i.e., the amount of time it takes for the ion to reach the detector). APT allows monitoring or tracking the order in which the ions arrive at the detector. The collected data may then be used to reconstruct a point cloud representative of approximate positions of the ions or atoms in the analyzed volume of the sample (see for example references 3 and 4). Of note, the chemical identity or composition of the ions may be determined using their mass-to-charge ratio calculated from the measured time-of-flight and the distance between the tip and the detector, i.e., an impact position on the surface of the detector (see for example references 7 and 8). The three-dimensional positions of the atoms or ions in the sample may be reconstructed by successively projecting or back projecting the measured detector positions of the atoms or ions onto a hemispherical tip surface while stacking them along an axis relatively aligned with a depth of the sample. Of note, this axis may be referred to as a "third axis".

Different parameters (sometimes referred to as the "reconstruction parameters") should be considered when analyzing APT data. For example, each type of atom (i.e., chemical element) may be associated with a corresponding volume to determine the progression of the stacking along the depth of the sample (i.e., with respect with the third axis). The angles formed between the tip and the detector may also be obtained (i.e., a tilt angle and a precession angle, globally referred to as the "characteristic angles"), either by being provided or determined. The evolution of the radius of the tip surface and the image compression factor (ICF) may also be obtained (see for example references 8 to 10). Of note, the ICF is typically defined as a ratio between angles of features located in the tip (i.e., in the material forming the sample) and the angles of the corresponding features being imaged (i.e., in the triangle formed between the tip and the position of the respective features on the detector, see for example references 9 to 11).

These parameters are typically estimated by the operators or users of the APT apparatus. This estimation or determination is usually based on their empirical knowledge of the material properties forming the sample (see for example references 3 and 8) and/or data obtained using other microscopy techniques (see for example references 8, 12 and 13).

The reconstruction of wide-angle APT data was developed in parallel with the APT apparatuses during the 1990s (see for example reference 3). Finding appropriate reconstruction parameters for any measurements has been an active area of research (see for example references 9 to 11), and it is known that the reconstruction parameters usually change throughout an APT measurement (see for example references 11 and 17). It is also known that wide angle APT data allow imaging some crystal features (see for example reference 18) and that these crystal features may be used to find the reconstruction parameters used in standard reconstruction techniques (see for example references 9 to 11). However, in standard techniques, the reconstruction parameters are manually or semi-manually extracted from the datasets (see for example references 8 to 11). Recent efforts have shifted towards improving algorithms used in APT data analysis to facilitate the identification or determination of the reconstruction parameters. These improvements generally concern pragmatic matching to other methods (see for example reference 17) or may rely on simulations (see for example references 19 to 21). These approaches are however time consuming, as simulations of APT analyses may last several days or weeks. In addition, existing approaches may not be applied to some samples, which may be justified by the lack of data from other methods or techniques, the structure of the material under investigation (which may be too complex for pragmatic matching) or the general lack of knowledge of appropriate material parameters which may be necessary to simulate the APT analysis (see for example reference 22).

The technology and its advantages will become more apparent from the detailed description and examples that follow, which describe the various embodiments of the technology.

Techniques for Analyzing APT Data

Broadly described, there are provided techniques for automatically extracting several properties of a sample under investigation during an APT measurement. The present techniques include a method for tracking and extracting atomic planes in three-dimensional APT data (sometimes referred to as "APT maps") and may be used for the extraction of the tilt angle and the precession angle, the determination of the tip radius and/or the determination of the ICF using the raw data produced by a typical atom probe tomograph (which may be referred to as an APT apparatus). The present techniques rely on using relatively small subsets of APT data obtained during APT measurements at a time to improve the processing speed of the APT data.

As it has been previously mentioned, APT measurements typically include successively projecting atoms as ions from the surface of a tip-shaped sample onto a position-sensitive single ion detector. The data acquired at the detector may then be back projected onto the tip surface to reconstruct a three-dimensional atomic model of the tip-shaped sample under investigation. Carrying out the back-projection typically requires knowing how the radius of the tip evolves (e.g., tip radius) and how angles are mapped when projecting the surface of the tip-shaped sample to the detector (ICF).

The present techniques more specifically concern methods for continuously and automatically extracting these two reconstruction parameters (tip radius and ICF) from raw APT data. The reconstruction parameters acquired in this way allow mapping distances and the characteristic angles in the collected APT data with high precision, which may be useful to the development of material structures like heterostructure, multilayers, superlattices, nanocrystalline materials and the optimization of their performances. Of note, their performances may include mechanical properties, optical properties, electronic properties, electrical properties, magnetic properties, optoelectronic properties, or any combinations thereof.

The present methods allow extracting the reconstruction parameters which may be used to produce images from acquired raw APT data, and broadly include automatically detecting, mapping and matching crystal features present in the analyzed sample. Of note, the reconstruction parameters of interest may be selected from the following list:

The volume of each type of ion detected during the measurement (which is not a geometric parameter). This volume may be used as an input for the present method;

The angles between the tip-shaped sample and the detector;

The radius of the tip-shaped sample between angles of features in the tip-shaped sample (i.e., in the material); and/or The ICF, i.e., the ratio between these angles, which may be directly inferred or calculated from the collected data. More specifically, the ICF is representative of the angles under which the respective features are imaged (i.e., in the triangle formed between the tip and the position of the respective features on the detector), see for example references 8 to 11.

As a first general step, the method may include mapping positions of imaged crystalline planes in raw APT data. This step may include selecting and/or adjusting the number of data points or collected ions. The raw APT data typically include x,y data as collected by the detector and ions can be stacked along the z-axis (or third axis) representing the sequence of arrival of the ions on the detector.

The raw APT data may be used in this way to create a 3D volume with a fixed adjustable length along the z-axis—named the "raw reconstruction". The method may also include determining and/or selecting a plurality of analysis windows, each being relatively smaller than the total area of the detector, as illustrated in FIG. 1. Doing so may help in obtaining an overall better signal when the analysis windows will be reconstructed. Of note, the distance along the z-axis may be kept relatively constant during the reconstruction.

The method includes creating a raw reconstruction of each analysis window and splitting-up each analysis window into a smaller adjustable grid, as shown for $R_{7,7}$ in FIG. 1. The z-coordinate of ions from each of the grid may be determined, and a fast Fourier transform (FFT) may then be applied. As noted in reference 23, the data treatment applied here makes it relatively likely that any crystalline signals picked-up during the APT analyses can be found along the z-axis.

The result of the FFT is analyzed as follows. The highest peak (i.e., the global maximum signal excluding the signal at 0) is found and its position is noted, recorder and/or stored. The height of the peak is evaluated against the rest of the data by calculating the mean and the standard deviation of the FFT and then determining how many standard deviations above the mean the peak is, which may be referred to as the "signal strength". The signal strength for each window and each reconstruction is evaluated and as the reconstructions (and hence FFT windows) overlap, the FFT signals from the corresponding window are averaged, thereby producing a 2D map of the average signal strength, wherein each data point results from multiple FFTs, the exact number depending on the chosen size of the analysis windows and the step size (i.e., the distance according to which the reconstruction window is moved). An example of such a map is shown in FIGS. 2A-C, together with clear evidence that relatively high signals are representative of the presence of atomic planes in the APT data.

As previously mentioned, the maps can be generated from an adjustable number of data points. Typically, a few million data points are enough and, as shown in FIG. 3, this allows to map the presence of signals from the crystal structure throughout the depth of the analyses on slices of approximately 10 nm for sufficiently large tips.

Figure 3:
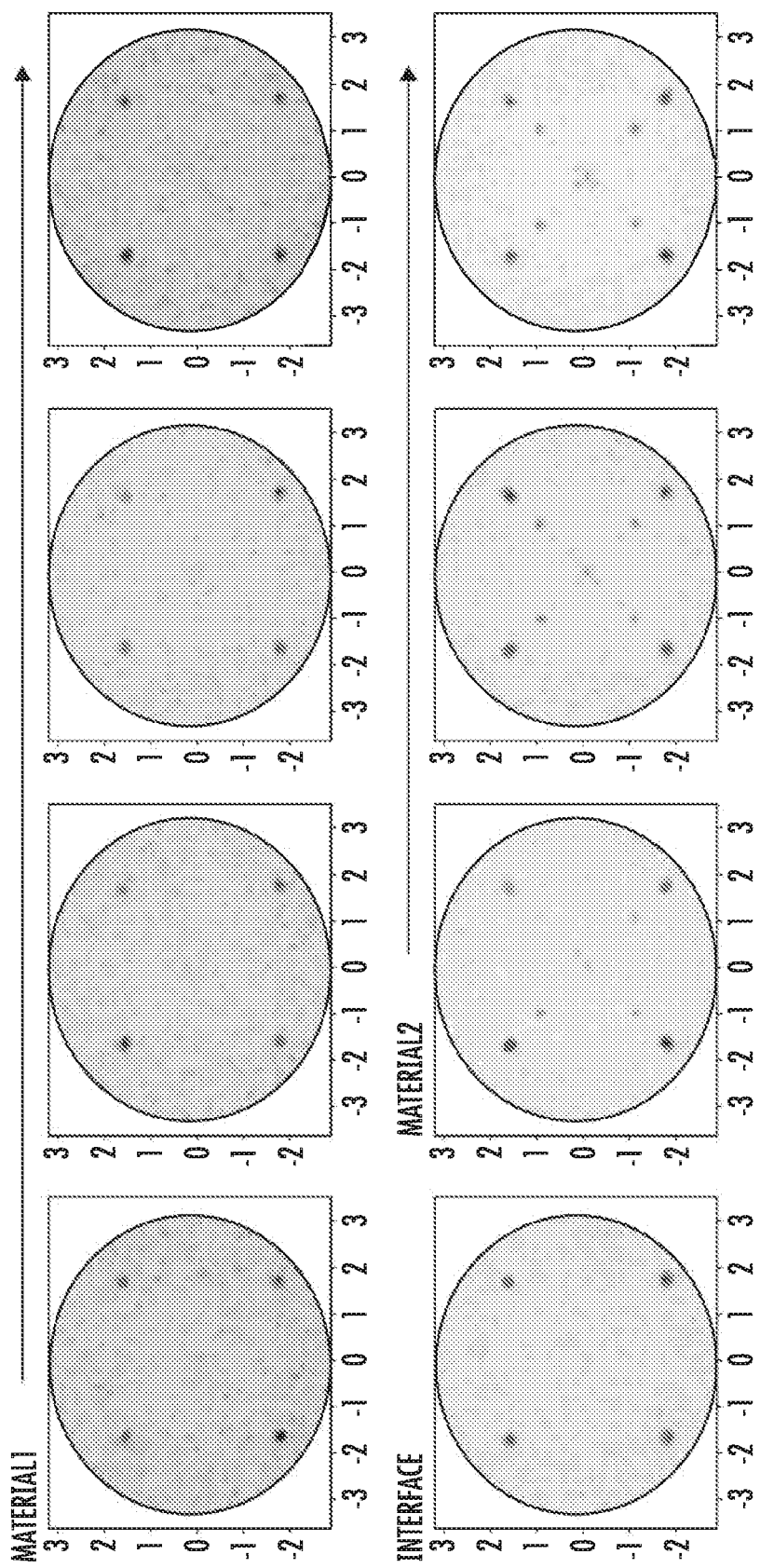
FIG. 3 presents a mapping of crystal features along the depth of the analyzed material stack, passing through an interface. Each slice includes 5×10e6 ions which coincides with approximately 10 nm of "real" depth (i.e., physical depth). The crystal features are mapped in both materials present in this analysis.
Figure 4:
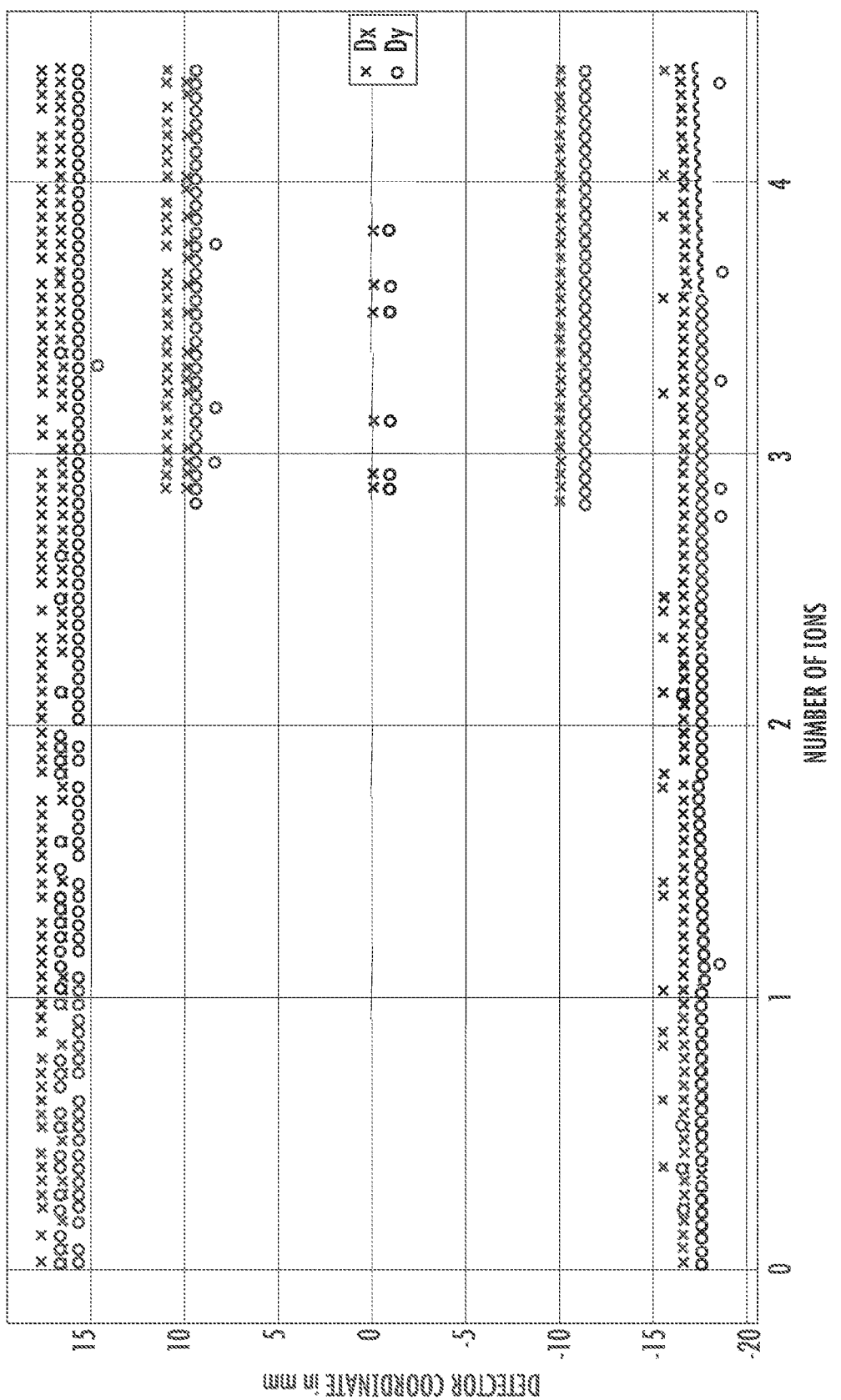
FIG. 4 shows the peaks identified by a peak search algorithm. The results presented in FIG. 4 is the full mapping of the data set as shown in FIG. 3. A mapping is carried out for every 5×10e6 ions. The interface region shown in FIG. 3 is at approximately 280×10e6 ions along the x-axis of FIG. 4.

FIG. 3 illustrates a sequence of maps that may be analyzed by a peak search algorithm (see for example references 14 and 15) to find the position of the crystal features on the detector, as displayed in FIG. 4. The peaks, shown in FIG. 4, may then be associated with crystal plane sets (see for example references 9 to 11 and 18).

Figure 5:
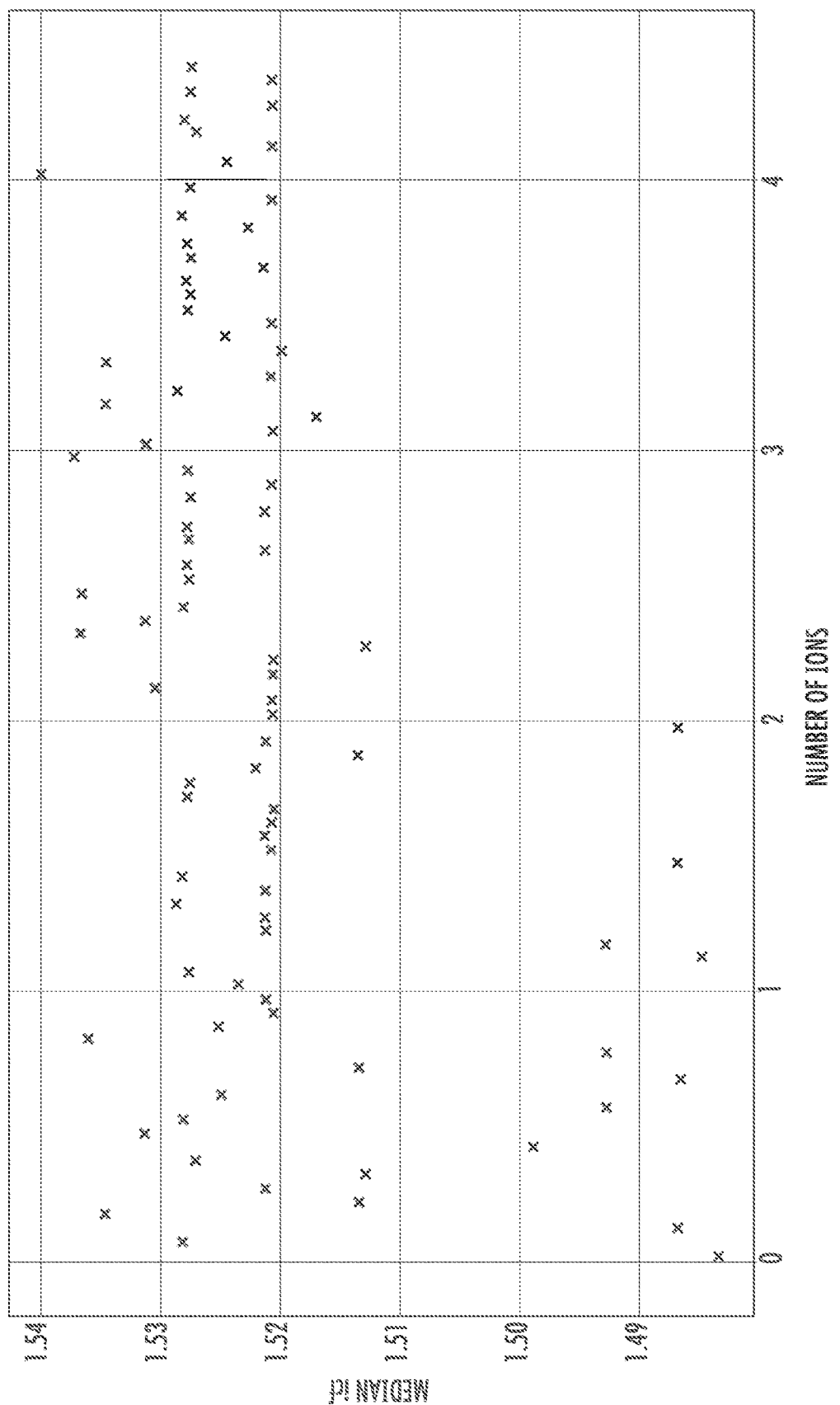
FIG. 5 illustrates the median image compression factor extracted from the tracked poles shown in FIG. 4 for each bin.

First, the crystal plane sets associated with a direction perpendicular to the surface of the tip-shape sample may be used to find the middle of the tip-shaped sample, and its corresponding position on the detector may be used to find the angle between the tip and the detector (see for example reference 3). Second, the angles between the plane sets in these crystals are known (see for example reference 25). The plane sets are also known to be parallel to the surface of the tip-shaped sample (see for example reference 23), and hence their position on the detector may be used to calculate the ratio between the angles under which they are projected onto the detector and the angles in the crystal, which corresponds to the ICF as defined above. Of note, the ICF may be calculated between any pairs of plane sets identified in FIGS. 2 to 4. The ICF extracted from different pairs does not need to be precisely the same as this would only have to be true if the surface of the tip-shaped sample formed a perfect hemisphere which is known not to be true (see for example reference 26). FIG. 5 shows the median ICF as extracted from all available pairs at any given depth. The method may also be used to get insight into the shape of the surface of the tip-shaped sample, by mapping out how the ICF and hence the angular projection changes over the surface. This may potentially inform new and relatively more precise reconstruction algorithms than the ones based on the "hemispherical assumption" that is currently applied to APT data in commercial systems.

Figure 2:
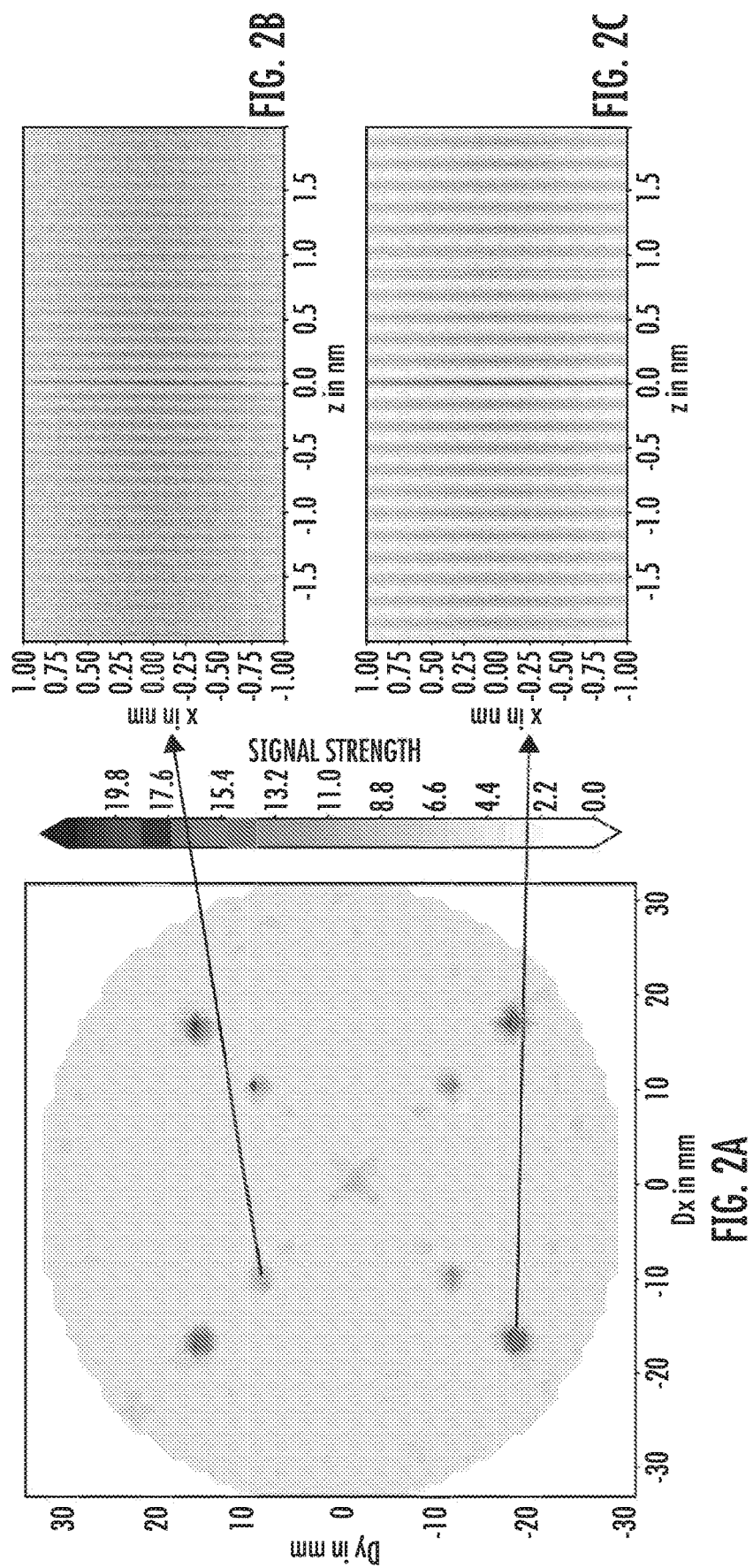
FIGS. 2A-2C illustrate a signal strength mapped over the APT detector (A) and spatial distribution maps [https://doi.org/10.1017/S1431927607070948] of data from two of the regions highlighted by the algorithm (B-C). As expected, both regions contain atomic planes when reconstructed with the appropriate parameters.
Figure 6:
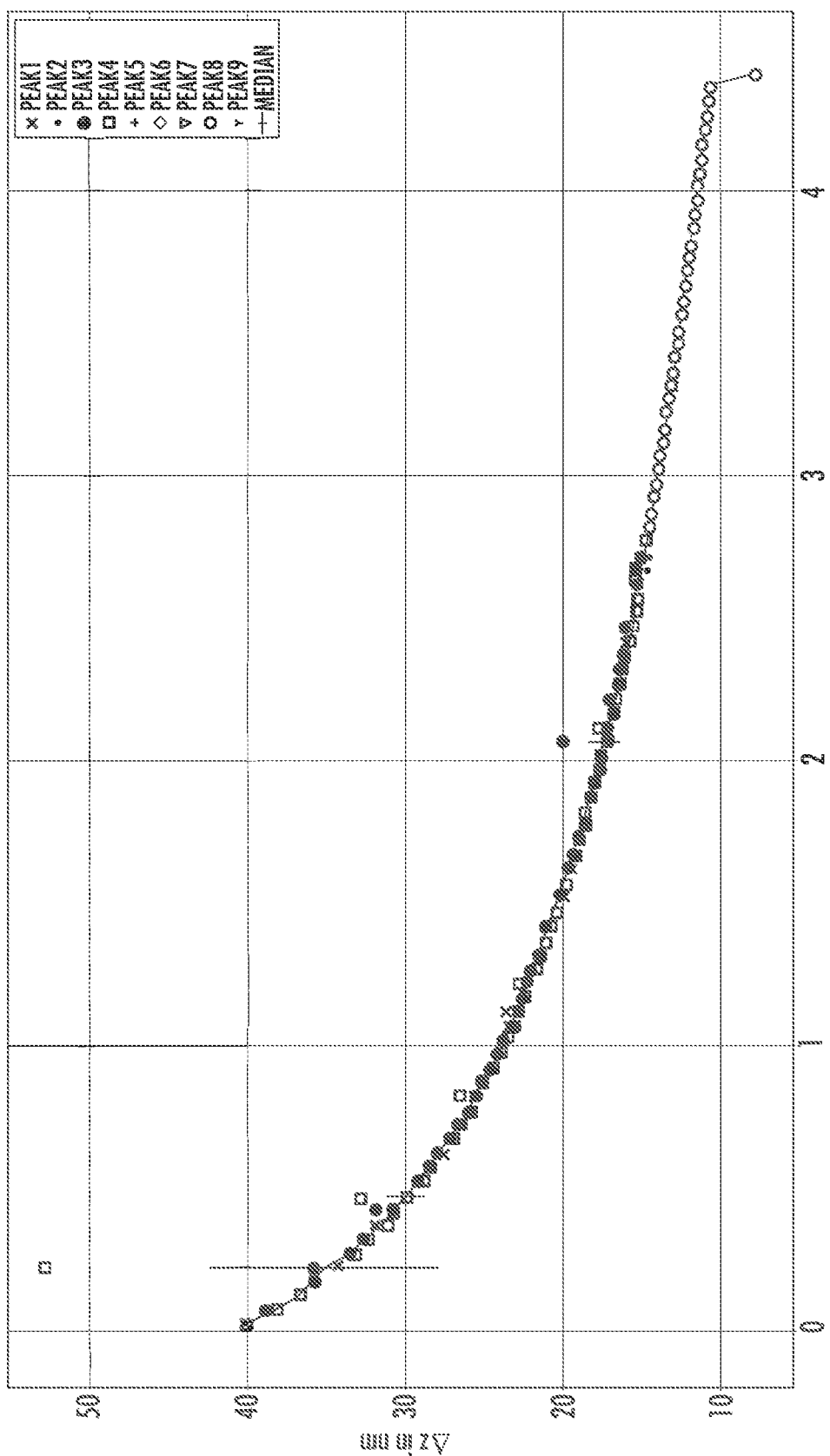
FIG. 6 shows the derived progress along the z axis (i.e., the "depth") for each sub-volume or slice used to calculate the maps in FIG. 3. This is done by counting the atomic planes in each sub-volume and making sure the z-progression matches the number of planes multiplied by the known distance between them.

The present techniques allow using the data shown in FIGS. 2 to 4 to calculate the radius of the tip of the tip-shaped sample. As noted above, the average position of the highest peak in Fourier space (see for example FIG. 1) may be extracted during the initial FFT based analysis of the raw data for each position on the 2D maps. This data may be combined with the identified plane sets. The average position calculated for the plane sets allows extracting how many crystal planes of each plane set are contained within the sub-volume or slice of the sample being used for each of the steps of the measurements. Because the distance between successive planes in the crystals (see for example reference 25) and the angles between the plane sets (see for example reference 25) are known, it is possible to calculate the actual distance covered along the depth axis by each sub-volume or slice for each crystal plane set. The result of such a calculation is shown in FIG. 6 and is representative of all identified poles, demonstrating the consistency of the present techniques.

Figure 7:
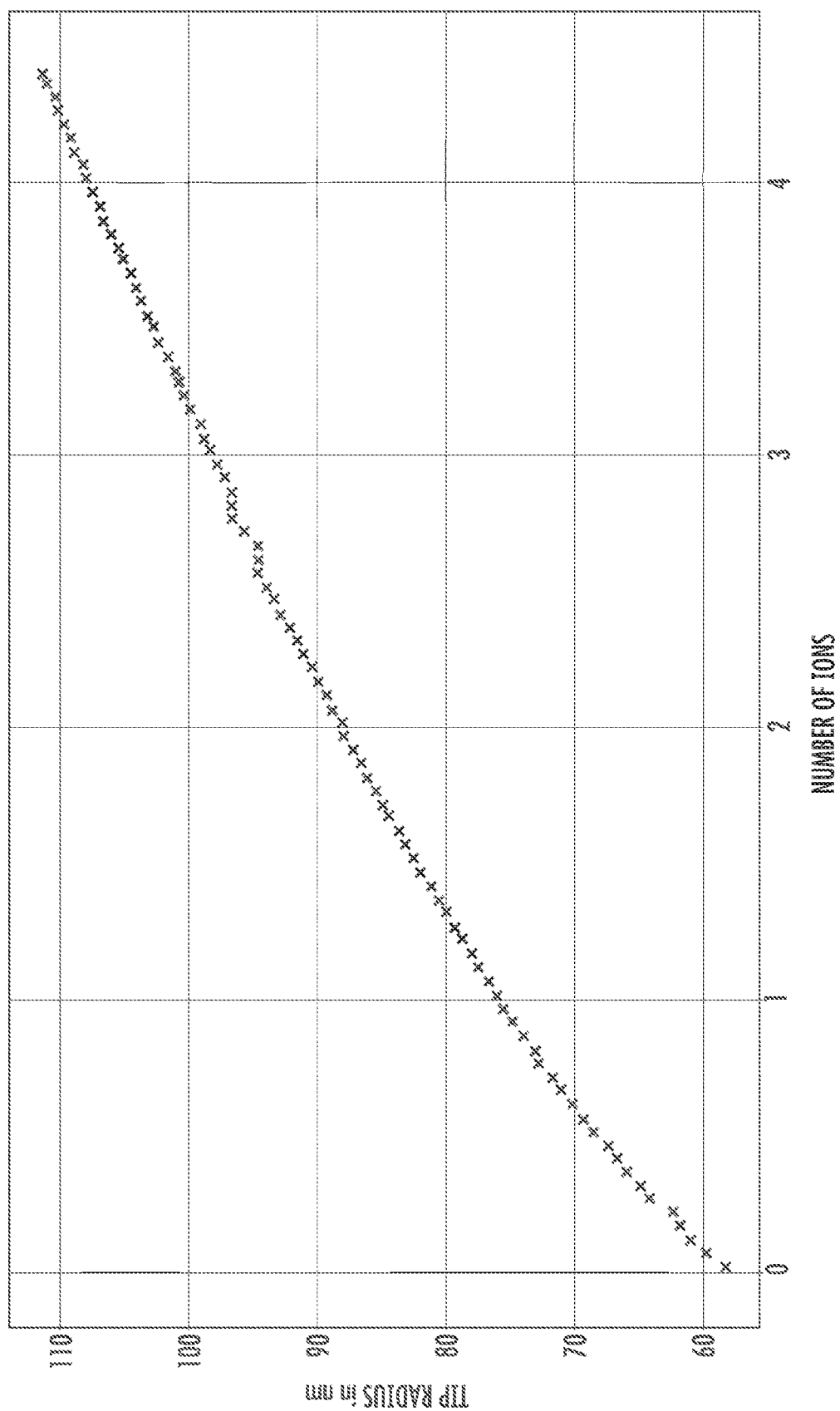
FIG. 7 illustrates the radius of the tip as calculated from the crystal features in FIG. 3 and the real volume of the sub-volumes as derived from the data in FIG. 6.

Combining the extracted ICF shown in FIG. 5 and the extracted progress along the depth axis allows calculating the radius of the tip of the tip-shaped sample during the progression of the measurements, as depicted in FIG. 7. The median value for the progression of each sub-volume or slice and the median value of the ICF at each sub-volume or slice for the subsequent calculation of the radius may be used. The radius may then be estimated or calculated by imposing that the volume of the imaged region coincides with the volume expected from the ionic species found within the sub-volume or slice. As explained above, the volume of each ion may be an input parameter just as in the standard method of reconstruction [see e.g. reference 3].

The techniques having been described allows for the progressive and continuous extraction of the reconstruction parameters used in the standard APT reconstruction protocol (see for example references 3, 4, and 8 to 11), based on automatically detected crystal features that are inherent to the analyzed materials.

While the identification and tracking of plane sets in APT data from semiconductor and compound semiconductor crystal can typically not be reached without the approach described here, it is known that APT analyses of metals reveal crystal features (see for example references 9 and 10) that can be used to calibrate the APT data reconstruction model (see for example reference 11) and track reconstruction parameters as the analysis progresses.

The present techniques may be readily applied to metals and may be used to automatically reveal the plane sets and/or a wide range of additional structures, as illustrated in FIGS. 8A-E.

Figure 8A:
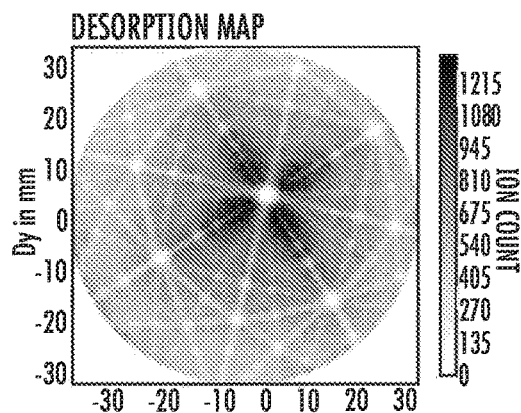
FIGS. 8A-8E present a desorption map from aluminum crystal measured in APT (A), signal strength of the method on the same dataset (B) and overlay of the two (C). The overlay reveals the presence of plane sets away from the poles and pole lines. Two plane sets found in these regions are shown (D, E).
Figure 8B:
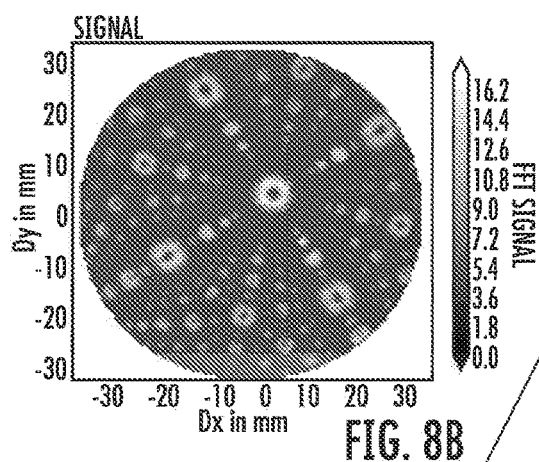

FIG. 8A show a desorption map from an APT measurement on an aluminum crystal. A distinctive desorption pattern is observed and may be directly related to the underlying crystal structure. The plane sets may be found within the low-density dot-like patterns known as "poles". Indeed, the poles are essentially the region on the surface of the tip-shaped surface where the presence of a cone or facet of the specific set of planes forms the shape of the surface (see for example reference 26).

Figure 8C:
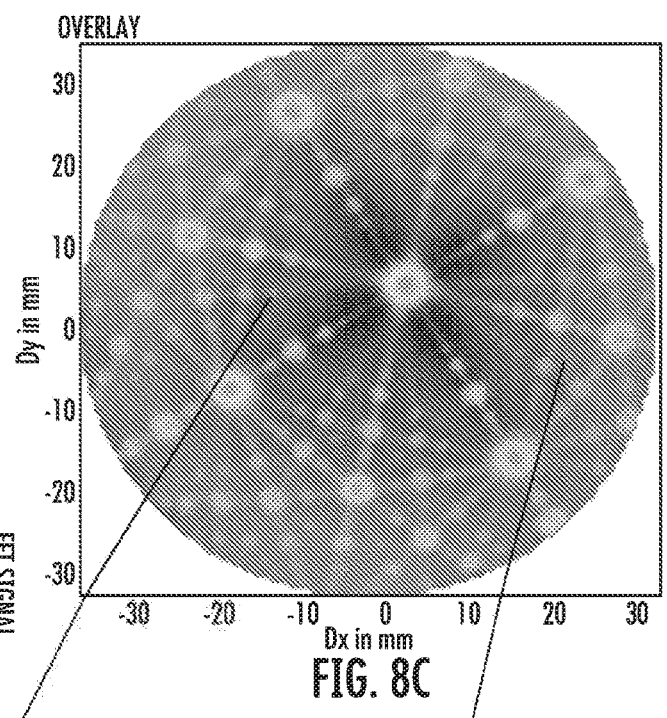
Figure 8D:
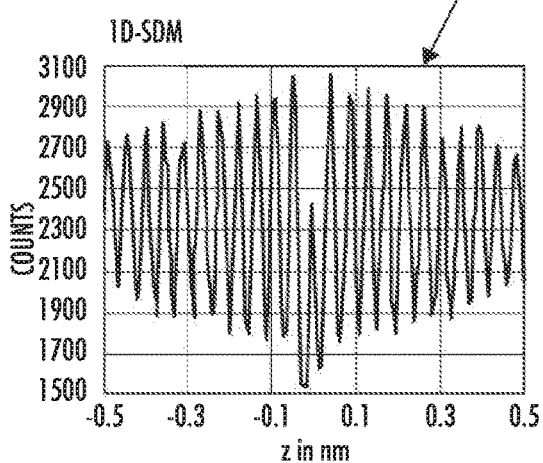
Figure 8E:
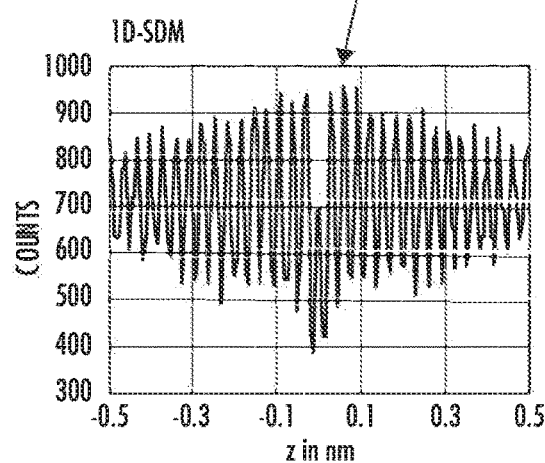

In addition to automatically revealing and tracking the plane sets, the present technique may be used to readily find additional regions that contain atomic structures. An overlay of the desorption map (e.g., FIG. 8A) and the signal strength map (e.g., FIG. 8B) is shown in FIG. 8C and illustrates the presence of signals away from the poles and the pole lines FIGS. 8E, D, show spatial distribution maps (see reference 28) along the z-axis for the region reconstructed revealing planes in the regions as expected (see for example reference 28).

Automatically revealing such a wide range of crystal features has direct applications in tracking the crystal structures of nano-crystalline metal alloys (see for example reference 27) and investigating the angular relations between the crystallites in poly-crystalline metal alloys (see for example references 12 and 13).

The present techniques allow dramatically speeding up such investigations as well as enabling these investigations in a variety of material systems where manual tracking of crystal features was not successful, too slow and/or not accurate.

Figure 9:
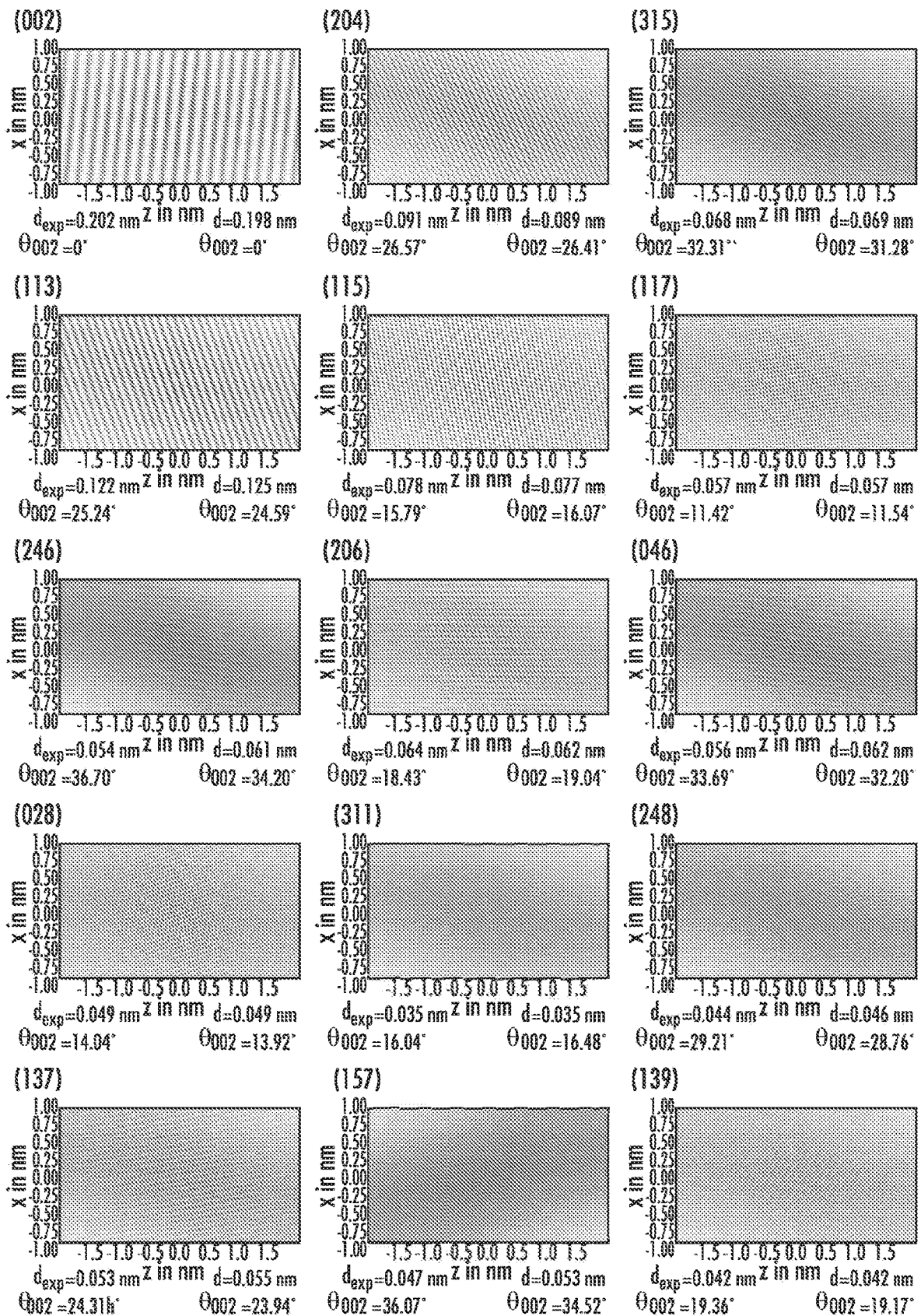
FIG. 9 illustrates examples of atomic plane sets retrieved using the techniques herein described. The data was obtained from an atom probe measurement in aluminum.

FIG. 9 illustrates examples of atomic plane sets retrieved using the techniques herein described. The data was obtained from an atom probe measurement in aluminum. FIG. 9 shows that atomic plane with a spacing down to at least 35 picometers are found by the present techniques. For each plane set a spatial distribution map is shown (see reference 28) [https://doi.org/10.1017/S1431927607070948], supporting that the atomic planes are indeed imaged in the data set at the position predicted by the present techniques. For each plane set the expected distance between planes and the expected angle to the (002) plane is compared to the measured spacing and angle in the reconstructed 3D image. FIG. 9 illustrates the usefulness of the present techniques in verifying and calibrating different reconstruction techniques for the generation of 3D atomic resolution images from atom probe data sets.

In one implementation, there is provided a method for analyzing atom probe tomography data. The method includes a step of performing a fast Fourier transform on z-coordinates of a dummy reconstruction to signal or determine the presence of crystal structures in sub-volumes of the measurement. The method also includes filtering the sub-volumes that are likely to contain crystal features. In some embodiments, the filtering step may include using a peak-filtering algorithm such as persistent homology. The method also includes tracking the crystal features throughout the volume. In some embodiments, the tracking step may include using an unsupervised machine learning algorithm such as a hierarchical clustering. The method also includes calculating an image compression factor (ICF) of the projection for each z-slice of sub-volumes, based on the identified crystal features and the angles between them. The method also includes calculating the radius of the tip based on the number of ions or atoms in the z-slice, the volume of the ions or the volume of the atoms, and the ICF. The method allows tracking the ICF and the radius of the tip throughout the measurement. The z-slices may be reduced to volumes corresponding to approximately 10 nm of actual material removal. The method may then be compatible with techniques for tracking these parameters on approximately 10 nm steps.

The method described above may be useful in improving the analysis of various materials using the commercially available APT apparatuses. The capabilities of the present techniques to accurately and automatically process APT data throughout the analysis of materials may enable three-dimensional mapping and tracking of atomic planes and an accurate determination of distances and angles in APT datasets. Accessing this atomic-level insight is of paramount importance to measure, design, and model a broad range of crystalline materials and material structures like multi-layers, super lattices and nanocrystalline materials.

Besides improving the capabilities of current commercial APT tools, the progress enabled by the present techniques may provide valuable insights to understand, improve, and/or optimize key properties of a variety of materials (e.g., metals, alloys, nanocomposite, semiconductors, and many others) currently used in industry or still in development. The broad sectors of metallurgy, microelectronics and IT, energy conversion, aerospace, transport, and many others may benefit from these capabilities.

In addition, the present techniques are associated with improvements and benefits over existing techniques for analyzing APT data. For example, and without being limitative, the present techniques allow automatically extracting all the geometric parameters as a sequence over the depth of an APT analysis, the window-by-window raw data reconstruction makes it significantly more likely that crystal features imaged by APT are detected during the automatic analysis and the window-by-window raw data reconstruction allows for a computationally efficient and quick method like the FFT to be used to map the signals in the data sets that are associated with the image of crystal planes.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the current description.

REFERENCES

[1] Blavette et al.: An atom probe for three-dimensional tomography, Nature 363, 432 (1993)
[2] Cerezo at al.: New dimensions in atom-probe analysis, Surface Science 266, 481 (1992)
[3] Bas et al.: A general protocol for the reconstruction of 3D atom probe data, Applied Surface Science 87-88, 298 (1995)
[4] Geiser et al.: Wide-Field-of-View Atom Probe Reconstruction, Microscopy and Microanalysis 15(2), 292 (2009)
[5] https://www.cameca.com/service/software/ivas
[6] https://www.cameca.com/service/software/apsuite
[7] Kelly: Atom probe tomography, Review of Scientific Instruments 78, 031101 (2007)
[8] Larson et al.: Local Electrode Atom Probe Tomography, Springer (2013)
[9] Gault et al.: Advances in the calibration of atom probe tomographic reconstruction, Journal of Applied Physics 105, 034913 (2009)
[10] Gault et al.: Advances in the reconstruction of atom probe tomography data, Ultramicroscopy 111, 448 (2011)
[11] Gault et al.: Estimation of the Reconstruction Parameters for Atom Probe Tomography, Microscopy and Microanalysis 14, 296 (2008)
[12] Herbig, Choi & Raabe: Combining structural and chemical information at the nanometer scale by correlative transmission electron microscopy and atom probe tomography, Ultramicroscopy 153, 32 (2015)
[13] Herbig et al.: Atomic-Scale Quantification of Grain Boundary Segregation in Nanocrystalline Material, Physical Review Letters 112, 126103 (2014)
[14] Edelsbrunner, Letscher & Zomorodian: Topological Persistence and Simplification, Discrete & Computational Geometry 28, 511 (2002)
[15] Zomorodian & Carlsson: Computing Persistent Homology, Discrete & Computational Geometry 33, 249 (2005)

[16] https://docs.scipy.org/doc/scipy/reference/cluster.hierarchy.html
[17] Vurpillot et al.: Pragmatic reconstruction methods in atom probe tomography, Ultramicrscopy 111, 1286 (2011)
[18] Ceguerra et al.: The rise of computational techniques in atom probe microscopy, Current Opinion in Solid State and Materials Science 17, 224 (2013)
[19] Beinke, Oberdorfer & Schmitz: Towards an accurate volume reconstruction in atom probe tomography, Ultramicroscopy 165, 34 (2016)
[20] Rolland et al.: New Atom Probe Tomography Reconstruction Algorithm for Multilayered Samples: Beyond the Hemispherical Constraint, Microscopy and Microanalysis 23, 247 (2017)
[21] Vurpillot & Oberdorfer: Modeling Atom Probe Tomography: A review, Ultramicroscopy 159, 202 (2015)
[22] Silaeva, Karahka & Kreuzer: Atom Probe Tomography and field evaporation of insulators and semiconductors: Theoretical issues, Current Opinion in Solid State and Materials Science 17, 211 (2013)
[23] Wallace et al.: On the retrieval of crystallographic information from atom probe microscopy data via signal mapping from the detector coordinate space, Ultramicroscopy 189, 65 (2018)
[24] Vurpillot et al.: Structural analyses in three-dimensional atom probe: a Fourier transform approach, Journal of Microscopy 203, 295 (2001)
[25] https://en.wikipedia.org/wiki/X-ray_crystallography
[26] Vurpillot, Bostel & Blavette: The shape of field emitters and the ion trajectories in three-dimensional atom probes, Journal of Microscopy 196(3), 332 (1999)
[27] Liddicoat et al.: Nanostructural hierarchy increases the strength of aluminium alloys, Nat. Commun. 1, 63 (2010)
[28] Geiser et al., Spatial Distribution Maps for Atom Probe Tomography, Microsc. Microanal. 13, 437 (2007)

The invention claimed is:

1. A method for analyzing an atom probe tomography data set obtained from a tip-shaped sample, the method comprising:
defining analysis sub-volumes in the atom probe tomography data set;
performing a fast Fourier transform (FFT) on each of the analysis sub-volumes to obtain a signal in a Fourier domain, wherein the FFT is applied on z-coordinates of data from the atom probe tomography data set;
identifying at least one FFT peak in the signal in the Fourier domain, each FFT peak being indicative of an expected crystal feature in the corresponding analysis sub-volume;
continuously and automatically calculating an image compression factor and a radius of the tip-shaped sample, based on identified crystal features, the identified crystal features being obtained from a collection of expected crystal features; and
reconstructing a three-dimensional model of the tip-shaped sample, comprising:
comparing the identified crystal features with calibration data; and
dynamically adjusting the image compression factor and the radius of the tip-shaped sample.

2. The method of claim 1, wherein the calibration data comprises at least one set of known crystal properties, said at least one set of known crystal properties comprising at least one of theoretical properties and empirical properties.

3. The method of claim 1, wherein each analysis sub-volume has a thickness corresponding to about 10 nm of a material forming the tip-shaped sample.

4. The method of claim 1, further comprising collecting two-dimensional data with a detector.

5. The method of claim 4, further comprising constructing the atom probe tomography data set by virtually stacking the two-dimensional data.

6. The method of claim 1, wherein said continuously and automatically calculating the image compression factor and the radius of the tip-shaped sample is performed in real time or near real time.

7. The method of claim 1, wherein said comparing the identified crystal features with the calibration data comprises determining whether the identified crystal features match the calibration data.

8. A computer-implemented method executable by a processor for analyzing an atom probe tomography data set obtained from a tip-shaped sample, said method comprising:
defining analysis sub-volumes in the atom probe tomography data set;
performing a fast Fourier transform (FFT) on each of the analysis sub-volumes to obtain a signal in a Fourier domain, wherein the FFT is applied on z-coordinates of data from the atom probe tomography data set;
identifying at least one FFT peak in the signal in the Fourier domain, each FFT peak being indicative of an expected crystal feature in the corresponding analysis sub-volume;
continuously and automatically calculating an image compression factor and a radius of the tip-shaped sample, based on identified crystal features, the identified crystal features being obtained from a collection of expected crystal features; and
reconstructing a three-dimensional model of the tip-shaped sample, comprising:
comparing the identified crystal features with calibration data; and
dynamically adjusting the image compression factor and the radius of the tip-shaped sample.

9. The computer-implemented method of claim 8, wherein the calibration data comprises at least one set of known crystal properties, said at least one set of known crystal properties comprising at least one of theoretical properties and empirical properties.

10. The computer-implemented method of claim 8, wherein each analysis sub-volume has a thickness corresponding to about 10 nm of a material forming the tip-shaped sample.

11. The computer-implemented method of claim 8, further comprising collecting two-dimensional data with a detector.

12. The computer-implemented method of claim 11, further comprising constructing the atom probe tomography data set by virtually stacking the two-dimensional data.

13. The computer-implemented method of claim 8, wherein said continuously and automatically calculating the image compression factor and the radius of the tip-shaped sample is performed in real time or near real time.

14. The computer-implemented method of claim 8, wherein said comparing the identified crystal features with the calibration data comprises determining whether the identified crystal features match the calibration data.

15. A non-transitory computer readable storage medium having stored thereon computer executable instructions for analyzing an atom probe tomography data set obtained from a tip-shaped sample, the computer executable instructions, when executed by a processor, cause the processor to perform the following steps:

defining analysis sub-volumes in the atom probe tomography data set;
  performing a fast Fourier transform (FFT) on each of the analysis sub-volumes to obtain a signal in a Fourier domain, wherein the FFT is applied on z-coordinates of data from the atom probe tomography data set;
  identifying at least one FFT peak in the signal in the Fourier domain, each FFT peak being indicative of an expected crystal feature in the corresponding analysis sub-volume;
  continuously and automatically calculating an image compression factor and a radius of the tip-shaped sample, based on identified crystal features, the identified crystal features being obtained from a collection of expected crystal features; and
    reconstructing a three-dimensional model of the tip-shaped sample, comprising:
      comparing the identified crystal features with calibration data; and
      dynamically adjusting the image compression factor and the radius of the tip-shaped sample.

16. The non-transitory computer readable storage medium of claim 15, wherein the calibration data comprises at least one set of known crystal properties, said at least one set of known crystal properties comprising at least one of theoretical properties and empirical properties.

17. The non-transitory computer readable storage medium of claim 15, wherein each analysis sub-volume has a thickness corresponding to about 10 nm of a material forming the tip-shaped sample.

18. The non-transitory computer readable storage medium of claim 15, further comprising collecting two-dimensional data with a detector.

19. The non-transitory computer readable storage medium of claim 18, further comprising constructing the atom probe tomography data set by virtually stacking the two-dimensional data.

20. The non-transitory computer readable storage medium of claim 15, wherein said continuously and automatically calculating the image compression factor and the radius of the tip-shaped sample is performed in real time or near real time.

21. The non-transitory computer readable storage medium of any one of claim 15, wherein said comparing the identified crystal features with the calibration data comprises determining whether the identified crystal features match the calibration data.

22. A system for analyzing an atom probe tomography data set obtained from a tip-shaped sample, the system comprising:

a detector operable for generating the atom probe tomography data set; and
  at least one processor configured for:
    defining analysis sub-volumes in the atom probe tomography data set;
    performing a fast Fourier transform (FFT) on each of the analysis sub-volumes to obtain a signal in a Fourier domain, wherein the FFT is applied on z-coordinates of data from the atom probe tomography data set;
    identifying at least one FFT peak in the signal in the Fourier domain, each FFT peak being indicative of an expected crystal feature in the corresponding analysis sub-volume;
    continuously and automatically calculating an image compression factor and a radius of the tip-shaped sample, based on identified crystal features, the identified crystal features being obtained from a collection of expected crystal features; and
    reconstructing a three-dimensional model of the tip-shaped sample, comprising:
      comparing the identified crystal features with calibration data; and
      dynamically adjusting the image compression factor and the radius of the tip-shaped sample.

23. The system of claim 22, further comprising a user interface in data communication with said at least one processor, the user interface being configured to provide inputs to the system.

24. The system of claim 23, wherein the user interface is a graphical user interface configured to provide a visual representation of the three-dimensional model of the tip-shaped sample.

25. The system of claim 22, wherein the detector is configured to collect two-dimensional data.

26. The system of claim 25, wherein said at least one processor is further configured for constructing the atom probe tomography data set by virtually stacking the two-dimensional data.

27. The system of claim 22, wherein the detector is a position-sensitive single ion detector.

28. The system of claim 22, wherein the calibration data comprises at least one set of known crystal properties, said at least one set of known crystal properties comprising at least one of theoretical properties and empirical properties.

29. The system of claim 22, wherein each analysis sub-volume has a thickness corresponding to about 10 nm of a material forming the tip-shaped sample.

30. The system of claim 22, wherein said continuously and automatically calculating the image compression factor and the radius of the tip-shaped sample is performed in real time or near real time.

31. The system of claim 22, wherein said at least one processor is further configured for determining whether the identified crystal features match the calibration data.

* * * * *